US 9,885,534 B2

(12) United States Patent
Boggess et al.

(10) Patent No.: US 9,885,534 B2
(45) Date of Patent: *Feb. 6, 2018

(54) MULTIPURPOSE FIREARM BUTT SECURING DEVICE AND METHODOLOGY

(71) Applicant: Evergreen Asset Management, LLC, St. Paul, MN (US)

(72) Inventors: Jerry Dean Boggess, Wesley Chapel, FL (US); David Sumner Tucker, Bloomington, MN (US)

(73) Assignee: Evergreen Asset Management, LLC, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/643,383

(22) Filed: Mar. 10, 2015

(65) Prior Publication Data

US 2015/0184977 A1    Jul. 2, 2015

Related U.S. Application Data

(63) Continuation of application No. 13/842,685, filed on Mar. 15, 2013, now Pat. No. 8,973,297.

(60) Provisional application No. 61/735,236, filed on Dec. 10, 2012.

(51) Int. Cl.
| | |
|---|---|
| *F41C 27/00* | (2006.01) |
| *F41A 23/18* | (2006.01) |
| *F41C 33/00* | (2006.01) |
| *F16B 1/00* | (2006.01) |
| *F16B 2/22* | (2006.01) |
| *F16M 13/02* | (2006.01) |
| *F41A 23/02* | (2006.01) |
| *F41A 23/16* | (2006.01) |

(52) U.S. Cl.
CPC .............. *F41A 23/18* (2013.01); *F16B 1/00* (2013.01); *F16B 2/22* (2013.01); *F16M 13/02* (2013.01); *F16M 13/022* (2013.01); *F41A 23/02* (2013.01); *F41A 23/16* (2013.01); *F41C 33/003* (2013.01); *F16B 2001/0035* (2013.01)

(58) Field of Classification Search
CPC .......... F41A 23/18; F41A 23/02; F41A 23/16; F41C 33/003; F16B 1/00; F16B 2/22; F16B 2001/0035; F16M 13/022; F16M 13/02
USPC ............................................................ 42/94
See application file for complete search history.

(56) References Cited

U.S. PATENT DOCUMENTS

| | | | | |
|---|---|---|---|---|
| 2,536,252 A | * | 1/1951 | Bates ............................ | 224/149 |
| 2,919,058 A | * | 12/1959 | Thompson .................... | 224/546 |
| 2,998,885 A | * | 9/1961 | Surface .......................... | 211/64 |
| 3,556,363 A | * | 1/1971 | Whittaker et al. ............. | 224/546 |

(Continued)

OTHER PUBLICATIONS

Magnetic Gun Caddy™ (www.magnetguncaddy.com) 2009-2013 (retrieved Jun. 17, 2013), 2 pgs.

(Continued)

*Primary Examiner* — Michelle R Clement
(74) *Attorney, Agent, or Firm* — Crawford Maunu PLLC

(57) ABSTRACT

Consistent with various embodiments, a firearm securing apparatus comprises a first surface configured and arranged to secure the apparatus to a support structure. Sidewalls extend away from the support structure and are configured and arranged to surround and support the butt of a firearm. A securing component is configured and arranged to prevent removal of the butt of the firearm from between the sidewalls.

18 Claims, 8 Drawing Sheets

(56) References Cited

U.S. PATENT DOCUMENTS

| | | | |
|---|---|---|---|
| 3,606,109 A * | 9/1971 | Brokus | 24/149 |
| 3,746,177 A | 7/1973 | Vilotti | |
| 4,018,339 A * | 4/1977 | Fritz | 211/8 |
| 4,057,180 A * | 11/1977 | Whittaker | 224/282 |
| 4,144,971 A * | 3/1979 | Balibrea | 211/64 |
| 4,333,385 A | 6/1982 | Culver | |
| 4,449,314 A * | 5/1984 | Sorensen | 42/94 |
| 4,461,385 A * | 7/1984 | Clouser | 211/4 |
| 4,792,050 A * | 12/1988 | Allen | 211/64 |
| 4,936,531 A * | 6/1990 | Bauser | 224/42.11 |
| 5,078,279 A | 1/1992 | Hancock et al. | |
| 5,263,592 A * | 11/1993 | Dingee, Jr. | 211/64 |
| 5,495,969 A * | 3/1996 | Cardenas | 224/275 |
| 5,626,379 A * | 5/1997 | Scott | 294/143 |
| 5,680,939 A * | 10/1997 | Oliver | 211/64 |
| 5,791,499 A * | 8/1998 | Zebbedies | 211/64 |
| 5,979,846 A * | 11/1999 | Fluhr | 248/200 |
| 6,042,080 A | 3/2000 | Shepherd et al. | |
| 6,155,523 A | 12/2000 | Pitre | |
| 6,793,184 B2 | 9/2004 | Dougal et al. | |
| 6,863,187 B1 * | 3/2005 | Robertson | 211/64 |
| 7,559,428 B2 * | 7/2009 | Matzick | 211/64 |
| 7,770,740 B2 * | 8/2010 | Punzel et al. | 211/64 |
| 8,266,835 B2 | 9/2012 | Pintar et al. | |
| 8,403,278 B1 | 3/2013 | Kasbohm | |
| 8,640,932 B2 * | 2/2014 | Dalton et al. | 224/149 |
| 8,678,206 B2 * | 3/2014 | Kubiniec | 211/64 |
| 2003/0150972 A1 * | 8/2003 | Murray et al. | 248/682 |
| 2005/0115137 A1 | 6/2005 | Minneman | |
| 2005/0133473 A1 * | 6/2005 | Lesperance | 211/64 |
| 2005/0145585 A1 | 7/2005 | Pintar | |
| 2007/0000851 A1 * | 1/2007 | Matzick | 211/64 |
| 2007/0170129 A1 * | 7/2007 | Punzel et al. | 211/64 |
| 2008/0127815 A1 | 6/2008 | Yale et al. | |
| 2010/0012691 A1 | 1/2010 | Hyle | |
| 2010/0102184 A1 | 4/2010 | Gorsuch et al. | |
| 2010/0236125 A1 | 9/2010 | Morrow et al. | |
| 2010/0314423 A1 * | 12/2010 | Kawamoto et al. | 224/195 |
| 2011/0042427 A1 * | 2/2011 | Goransson-Sonnefelt | 224/149 |
| 2011/0167705 A1 | 7/2011 | Cauley et al. | |
| 2011/0168649 A1 * | 7/2011 | Stolz | 211/4 |
| 2012/0193254 A1 * | 8/2012 | Kubiniec | 206/317 |
| 2012/0246900 A1 | 10/2012 | Shimmel et al. | |
| 2013/0269509 A1 | 10/2013 | Irwin | |

OTHER PUBLICATIONS

StickimUp Gun Magnets, Crime Intervention Devices Corp. LLC (www.stickimupgunmagnets.com), retrieved Dec. 5, 2013, 5 pgs.

Magnetic Barrel Rest (www.battenfeldtechnologies.com), retrieved Dec. 5, 2013, 3 pgs.

FastRak—Magnetic Gun and Fishing Pole Holder, The Outdoor Connection, Inc. (www.outdoorconnection.com), retrieved Dec. 5, 2013, 4 pgs.

Barrel and Rod Safe, Hunter's Specialties, Inc. (www.hunterspec.com), retrieved Dec. 2013, 4 pgs.

* cited by examiner

MULTIPURPOSE FIREARM BUTT SECURING DEVICE AND METHODOLOGY

OVERVIEW

The aspects of the present disclosure relate generally to securing firearms, and to systems, methods and devices for helping to secure the butt of small arms using a device designed with multiple mechanisms for attachment, protection and related uses.

Small arms can be categorized into long guns and hand guns. Long guns have extended lengths and are designed to be fired while braced against the shoulder. This feature along with the longer barrel and greater stability, can increase accuracy for a shooter. The additional length, however, can make long guns difficult to carry and store. For instance, long guns can be particularly problematic when performing work in tight quarters, such as military personnel performing day-to-day activities on a naval vessel, in vehicles, aboard aircraft or even in the field. Improper storage can result in the weapons falling to the ground, striking other objects or even banging into other weapons. This can cause bent barrels, broken sights and unstable optics, which can render the weapon unusable, inaccurate, and even unsafe. Moreover, a fallen weapon can be more difficult to retrieve, which may slow down a soldier when time may be of critical importance.

Permanently affixed storage weapon lockers and weapon racks offer adequate solutions for storing long guns. While such solutions can be useful, they require time and effort to install, and possibly prior knowledge of appropriate and effective storage locations. This is often less than ideal. For instance, soldiers may find the need to set down their weapons in unanticipated locations. Moreover, permanent solutions in multiple locations can be costly, take up valuable space and add unnecessary weight when placed on vessels.

Aspects of the present disclosure relate to multipurpose solutions for securing long arms and to solutions with particular usefulness in military environments. Other aspects relate to various uses stemming from the firearm being secured by a device for maintenance, cleaning or other activities.

SUMMARY

Aspects of the present disclosure are directed to multipurpose weapon (firearm)-butt securing devices, and methods of using, that address challenges including those discussed herein, and that are applicable to a variety of applications. These and other aspects of the present disclosure are exemplified in a number of implementations and applications, some of which are shown in the figures and characterized in the claims section that follows.

Particular embodiments of the present disclosure are directed toward a multipurpose device for securing the butt of small arms. The device can be specially configured with a number of features, some of which can be particularly useful for military applications.

Consistent with various embodiments, a firearm securing apparatus comprises a first surface configured and arranged to secure the apparatus to a support structure. Sidewalls extend away from the support structure and are configured and arranged to surround and support the butt of a firearm. A securing component is configured and arranged to prevent removal of the butt of the firearm from between the sidewalls.

Other embodiments relate to manufacturing and uses of such multipurpose devices.

The above summary is not intended to describe each illustrated embodiment or every implementation of the present disclosure.

BRIEF DESCRIPTION OF THE DRAWINGS

The disclosure may be more completely understood by considering the following detailed description of various embodiments of the disclosure in connection with the accompanying drawings, which are consistent with the various embodiments of the present disclosure as follows.

Figure 1:
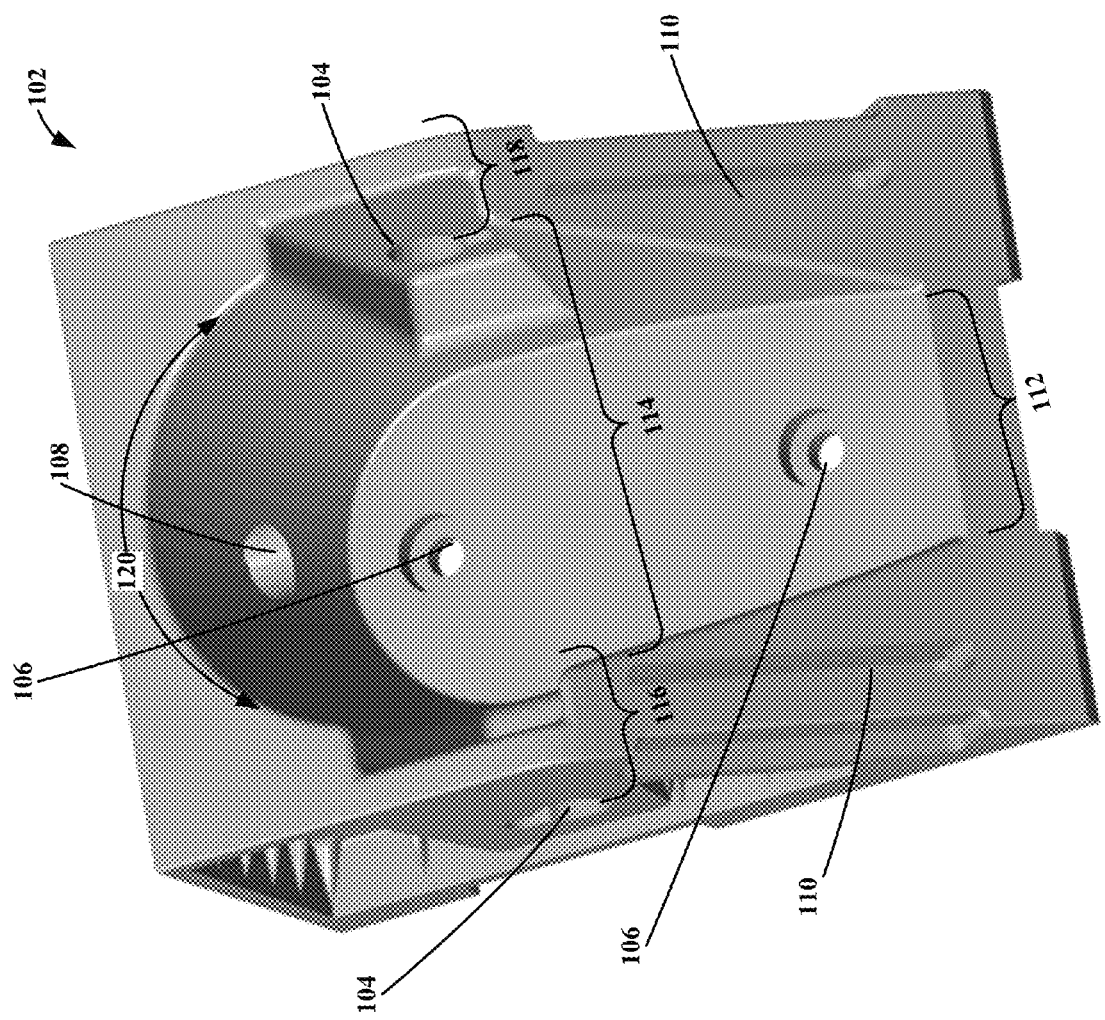
FIG. 1 depicts a unit for an experimental embodiment of a Multi-Purpose Butt Plate Holder ("MPBPH"), consistent with embodiments of the present disclosure.

While the disclosure is amenable to various modifications and alternative forms, specifics of the disclosure are shown by way of example in the drawings and will be described in detail. It should be understood, however, that the disclosure is not necessarily limited to the particular embodiments described. On the contrary, the intention is to cover all modifications, equivalents, and alternatives falling within the spirit and scope of the disclosure.

DETAILED DESCRIPTION

Aspects of the present disclosure are directed to multipurpose devices for securing the butt of small arms and to related approaches, uses and systems. While the present disclosure is not necessarily limited to such applications, various aspects of the disclosure may be appreciated through a discussion of various examples.

Certain aspects of the present disclosure are directed toward a device that allows small arms to be secured to a variety of different surfaces. Particular embodiments include one or more securing mechanisms that allow the device to be relocated and reused in a variety of different locations having different attachment surfaces. Certain aspects can be particularly applicable to military applications and uses.

According to certain embodiments, a first surface can be configured to interface with a support structure such as a floor, wall or table. This first surface can include one or more attachment mechanisms for allowing the device to be attached, removed and reattached to different structures and in different positions and locations. Thus, certain embodiments include multiple attachment mechanisms, each of which may be suitable in different situations and for different structures. More particular aspects can be useful for military personnel who carry a portable Multi-Purpose Butt Plate Holder ("MPBPH") device in order to secure the firearm at a wide variety of locations and/or stabilize the weapon, while still being able to seize a firearm at a moment's notice. The use of the term "butt plate" does not necessarily exclude the stock, buttstock or shoulder stock. For instance, the butt plate can be inserted into the MPBPH device and secured therein. At the same time, the buttstock or shoulder stock can also be secured.

The attachment mechanisms can include well-known solutions, such as magnets. Consistent with these approaches, the magnets can be placed in recessed cavities (see, e.g., U.S. Pat. No. 6,155,523 (discussing a magnet within a recessed casing); and U.S. Pat. No. 6,793,184 (discussing a magnetic attachment using countersunk magnets and recessed portions), each of which is fully incorporated herein by reference). Placement of magnets in recesses can facilitate flush placement of the MPBPH's first surface against a metal surface, and/or can provide for an air gap between the magnet and the magnetic surface to which the device is attached. While this well-known attachment mechanism has its uses, it has been discovered that other attachment options may be desirable. This discovery can be particularly relevant for military applications, e.g., due to the use of composite (non-ferromagnetic) materials for certain military vessels and vehicles. Accordingly, embodiments are directed toward the use of specialized attachment solutions, which can be used alone or in combination.

The MPBPH can be configured with sidewalls designed to secure the butt of a weapon/firearm. These securing sidewalls can be configured and arranged to allow the butts of different types of firearms to be secured to the device. For instance, the sidewalls can be shaped in a "U" shape with a curved back stop for the butt. In certain embodiments, the sidewalls can be angled to create a cavity that is sized to secure the butts of multiple different types of firearms.

Embodiments of the MPBPH are designed for use with additional attachment solutions and/or as a standalone item for securing a weapon. The MPBPH can also be designed for attachment to a wide variety of different structures. A few non-limiting example structures include walls, floors, ceilings, doors, windows, vehicle panels, wheel or track vehicles, boats, airplanes, helicopters, trees, rocks, wheels, sheds, cabinets, boxes, chairs, tables, desks, armored vehicles, wall lockers, fences, utility poles and more. For ease of discussion, the identification of a particular type of structure (e.g., a floor or wall) will be understood to not be limiting unless otherwise stated.

Particular embodiments of the present disclosure are directed toward the contacting portion of the first surface being substantially planar. A planar configuration conforms to numerous surfaces, even surfaces that are themselves not perfectly planar. Other embodiments of the present disclosure are directed toward the first surface having a non-planar interface. For instance, one embodiment can include a curved interface. This can be particularly useful for attachment of the device to poles and similar objects. Another embodiment can be shaped as an L-bracket. This can be particularly useful for placement at the corners of exterior walls or at the top of a wall, among other uses. Other variations are also possible.

The first surface can also be configured to include graspable portion(s) or handle(s) that can be used when applying/securing the device to a structure and also when removing the MPBPH device from the structure. This can be particularly useful for an adhesive-like securing mechanism that uses a rocking motion and pressure to fully engage.

In certain embodiments of the present disclosure, the device includes a leverage point in the form of an opening or protrusion that allows a tool to be inserted between the device and a wall or other structure. In particular, some type of lever can be used to dislodge the device from a wall by inserting the lever to provide mechanical force to separate the wall and the device. For instance, the leverage point can be designed to accommodate readily available equipment, such as a multi-tool or a knife blade. The leverage point can be designed with additional support and/or reinforced to withstand the force used to remove the device from an attached structure. The support can include additional thickness in the first surface around the leverage point and/or plating the leverage point with a sturdy material, such as metal.

Consistent with various embodiments, the device can be ergonomically designed to allow the user to quickly and comfortably engage or disengage the unit using one or more of attachment mechanisms, such as Dual Lock fastening material, magnets or key slots. The handles can include textured surfaces to allow for a firm grip, even when wet.

In certain embodiments, a specially-designed tool can be included with the device. In one instance, the tool can be a separate item. For instance, the tool can take the form of a curved bar where the curved portion is designed to act as a fulcrum point (against a wall) when one end of the tool is in contact with the leverage point. This bar can be carried separately from the device. In other embodiments, the device can also include a holding mechanism for storing the tool when it is not in use. The tool can then be removed and used whenever the device is to be removed from a wall or other structure.

In other embodiments, the device can include an integrated tool. For instance, the device can include an integrated extension member that provides additional leverage for removal of the device from a wall or similar structure.

Various experimental devices and related uses are discussed hereafter. These experimental aspects provide support for numerous different embodiments and are not meant to be limiting.

The MPBPH can be made from a variety of materials, including various thermoplastics. Certain embodiments are directed toward the use of a glass filled nylon material and/or a glass filled polypropylene material. In other embodiments, the MPBPH is injection molded using Santoprene, a resin with properties similar to vulcanized rubber. The injection molded MPBPH can be secured to virtually any type of surface using at least one of: magnets, screws, nails or a reclosable fastener system. For instance, screw holes and screws allow the MPBPH to be (relatively) permanently mounted to a surface from any of four different sides (left, right, the rear or the bottom). This can be particularly useful in controlled environments, such as vehicles, ships, planes, armories and offices. These attachment mechanisms can be combined with a gripping material. The gripping material can be configured to resist shearing pressures that are parallel to the attached surface (e.g., to resist downward pressure when the device is attached to a wall).

FIG. 1 depicts a unit for an experimental embodiment of a Multi-Purpose Butt Plate Holder ("MPBPH"), consistent with embodiments of the present disclosure. MPBPH 102 has sidewalls 116 and 118. Together, these sidewalls form an opening, identified by locations 112, 114, that is configured and arranged to receive and support the butts of different firearms. Consistent with certain embodiments, the sidewalls can be angled such that the width of the opening is smaller at one location 112 relative to another location 114. This "V" like shape helps to guide the weapon butt into the MPBPH. The sidewalls can also be connected by a curved portion 120. When the MPBPH is in use, the curved portion of the butt can fit against the curved portion 120. This curved portion 120 can increase in radius toward the top of the MPBPH, which can also help to guide the weapon butt into the MPBPH.

The MPBPH can be configured and arranged to facilitate the insertion and removal of a firearm butt plate from multiple directions and as might be relevant for different orientations of the firearm. For instance, when the firearm is to be secured in a vertical direction (relative to gravity), it can be convenient to insert and remove the firearm in the vertical direction. The V-like shape can be particularly useful for such uses by guiding the firearm butt plate down toward the base of the MPBPH. The MPBPH can also include a horizontal opening at locations 112, 114. This opening can facilitate insertion and removal of a firearm butt plate in the horizontal direction, which can be particularly useful for when the firearm is to be secured in a horizontal orientation. For instance, the firearm can be lowered into the MPBPH until it contacts and rests upon the curved portion 120.

Consistent with particular embodiments, the MPBPH is approximately 3" by 4" in size and can accommodate weapons with butt widths up to 1.625" and 6" long. This will accommodate many (or even most all) non-crew served weapons used by the United States Armed Forces. A slightly larger version of the MPBPH accommodating butt widths up to 2.5" would secure the larger, non-crew served weapons, which may not fit in the 1.625" version.

This is facilitated by making the opening for the weapon stock in the form a V. The butt of the weapon is also slid to the rear of the holder. The butt stock of the weapon can then be secured to the base by using a (Velcro) strapping system.

The MPBPH also includes graspable portions/handles 110, which can include slots for attaching a securing component such as a flexible strap. This flexible strap can be configured and arranged to secure the butt of the firearm.

Various embodiments are directed toward a strapping system, which can use military spec/flame retardant Velcro, or other material that meets military specifications. The flame retardant properties can be particularly useful for use on ships and aircraft. In certain instances, the strap can be 1.5" wide and 16" long, although the strap can be longer or shorter if desired. A (black) molded plastic D Ring can be attached (e.g., heat welded) to one end of the strap. The other end can be rounded to prevent injuries from sharp edges. Extending twelve inches from the D ring, the strap is fabricated from Velcro-type loop material. Four inches of Velcro hook material can be attached (e.g., heat welded) to the end of the loop material.

To use the strap, a rounded end is inserted up through the slot on either handle 110 of the MPBPH. The strap is pulled over the butt stock of the weapon, fed down through the other handle, pulled tight and the rounded or hooked end is placed on the loop material and secured. Special cavities have been designed to accommodate the D ring on the sides of the MPBPH next to the handles. When the strap is pulled tight, the D ring is pulled into and can nest flush in one of the cavities. This protects the D ring and allows two MPBPH units to be put side by side without obstruction by the D ring. When not in use, the strap can be fed through the handles and secured to itself.

Consistent with embodiments of the present disclosure, the MPBPH can include one or more openings (or holes) that allow a screw or nail to be used for attaching the MPBPH to different surfaces. For instance, screw/nail holes at locations 106 allow the MPBPH to be screwed/nailed to a surface that is substantially perpendicular to the orientation of a secured firearm. For instance, if the firearm is secured vertically relative to the ground, the MPBPH can be nailed to the floor or to a similar horizontal surface, such as a table top. Screw/nail hole 108 allows the MPBPH to be attached to a surface that is substantially parallel to the orientation of a secured firearm. For instance, if the firearm is secured vertically, the MPBPH can be nailed to a wall or to a similar vertical surface. Key slots 104 allow the MPBPH to be attached to a surface that is substantially parallel to the orientation of a secured firearm; however, the MPBPH and the secured firearm can be rotated ninety degrees relative to when the hole at location 108 is used. The particular configuration of key slots and screw/nail holes can be modified as desired. For instance, key slots can be used in place of screw/nail holes in either of locations 106 or 108 and vice versa. Consistent with embodiments of the present disclosure, the screw holes at locations 106, 108 can be countersunk so that the head of a nail or screw does not contact or damage a firearm that is secured in the MPBPH.

Figure 2:
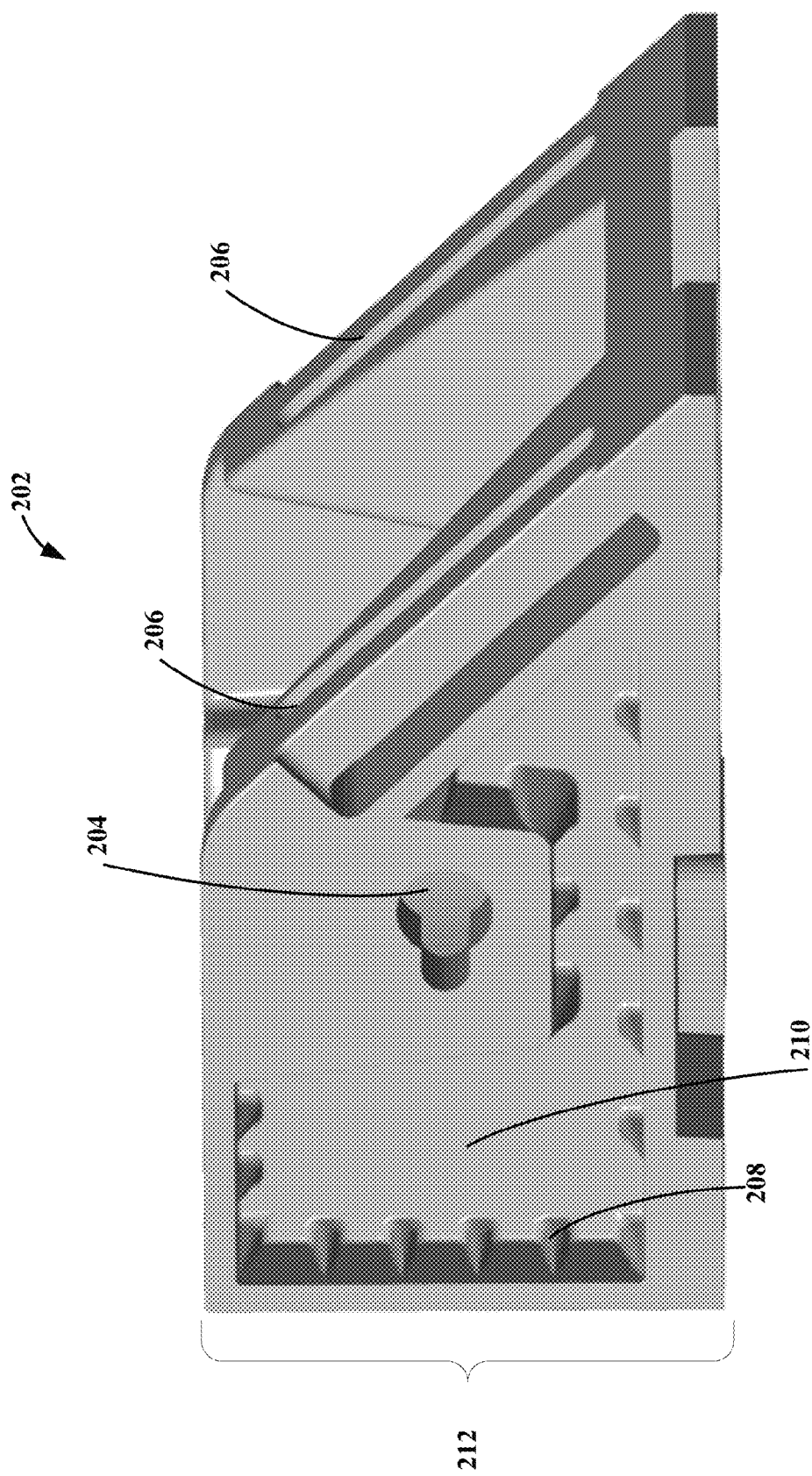
FIG. 2 depicts a side view of an experimental embodiment of a MPBPH, consistent with embodiments of the present disclosure.

FIG. 2 depicts a side view of an experimental embodiment of a MPBPH, consistent with embodiments of the present disclosure. MPBPH 202 includes both key slot 204 and slots 206, as discussed in connection with FIG. 1. Moreover, the sidewall 212 is configured with a recessed portion 210 and support fingers/buttresses 208, which extend from within the recessed portion. The recessed portion 210 can be useful for reducing the weight of the MPBPH and/or for providing a graspable location. For instance, a person using the MPBPH can more easily grasp the device so that it can be secured onto or removed from a suitable support structure. This is particularly useful when using a reclosable fastener system that requires pressure in order to apply or remove the MPBPH from a support structure. The buttresses 208 can be configured and arranged to provide additional strength to the sidewalls.

Figure 3:
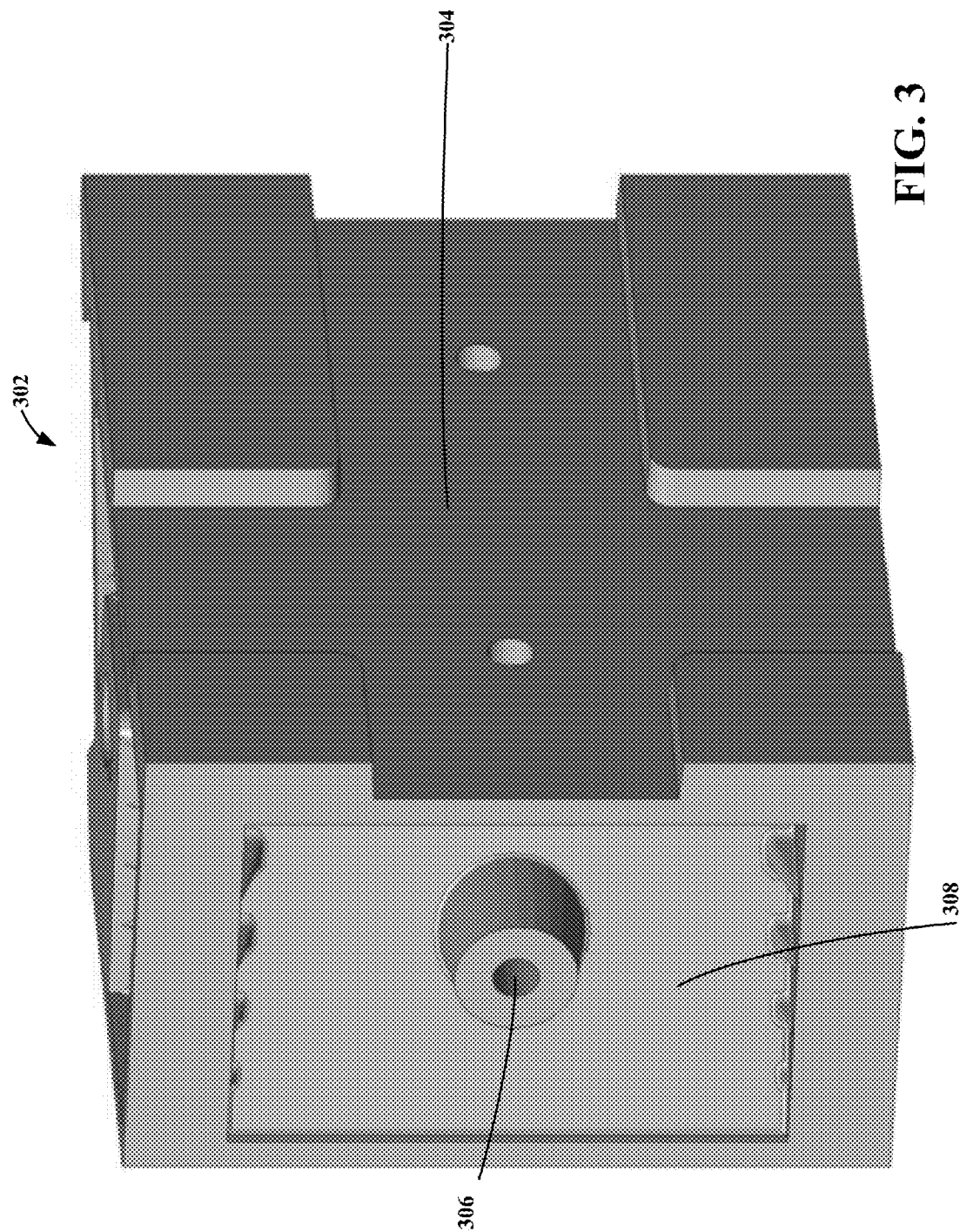
FIG. 3 depicts a view of the bottom and back of an experimental embodiment of a MPBPH, consistent with embodiments of the present disclosure.

FIG. 3 depicts a view of the bottom and back of an experimental embodiment of a MPBPH, consistent with embodiments of the present disclosure. The rear wall of the MPBPH 302 can include a recessed portion 308. This recessed portion can be useful for reducing the weight of the MPBPH 302 and/or for providing a graspable location. As shown in FIG. 3, the recessed portion is deeper toward the bottom the MPBPH 302 because it follows the change in size/radius for the curved portion of the rear wall. In certain embodiments, support buttresses can be included to provide additional strength.

As shown in FIG. 3, the screw/nail hole can include an extension piece 306 that is configured and arranged to be flush with the external surface of the rear wall of the MPBPH 302. This extension piece 306 can thereby provide additional stability when the MPBPH 302 is attached to a planar surface, such as a wall.

FIG. 3 also depicts a channel 304 in the bottom of the MPBPH 302, formed by a "+" shaped recess. This channel can be filled with one half of a reclosable fastening system, such as 3M Dual Lock®, which contains hundreds of mushroom-shaped plastic stems that audibly snap together to form a secure attachment approximately five times stronger than Velcro. Two opposing pieces of a reclosable fastening system fasten to each other in order to create the bond. In this manner, one half of the reclosable fastening system can be located within the channel 304, and the other half can be placed upon a support structure, such as a wall or the floor. When a strip of a reclosable fastening system is placed on a support structure, the + shape for the channel 304 allows for the MPBPH to be turned 90 degrees and still be attached to the applied strip. This can be particularly useful when a firearm has large protrusions, such as a large optical sighting scope.

Aspects of the present disclosure are directed to features of the other half of the reclosable fastening system, which allows the device to be secured to a variety of different surfaces. For instance, the other half of the reclosable fastening system (e.g., the Dual Lock material) can be located on a first side of a double-sided strip. The other side of the strip can have an adhesive that allows the strip to be attached to a wall, floor or other structure. The second side can include the other half of the reclosable fastening system that bonds to the MPBPH in a reusable manner.

In particular embodiments, adhesive material (e.g., 3M 250 stem Dual Lock with VHB adhesive: SJ3550CF) can be placed in the channel 304. The four open ends of the + shaped channel 304 allow the user to visually line up the two halves of the reclosable fastening system (e.g., to line up Dual Lock on the MPBPH and Dual Lock attached to the fastening surface).

Consistent with embodiments of the present disclosure, the channels can be designed to have a sufficient depth such that the reclosable fastening material (e.g., Dual Lock material) will not interfere with the functions of other fastening components (such as magnets and screw holes), but the material will still be able to interact with the opposing half of the reclosable fastening system. Placing one half of the reclosable fastening system within the channel 304 can also be useful for allowing the use of screw holes without damaging the reclosable fastening system.

In certain embodiments of the present disclosure, the remaining raised sections can be covered with a gripping material (e.g., Santoprene or a 3M Gripping Material/Tile). This gripping material can be over-molded directly into the bottom of the MPBPH 302. In particular embodiments, the over-molding can cover all areas other than the locations of magnets, such as two magnets (not shown in FIG. 3) in opposite corners of the lower platform.

Embodiments of the present disclosure are directed toward camouflage and/or concerns over the visibility of the MPBPH 302 to an enemy combatant. A clear reclosable fastening system can blend with any resin color of the MPBPH 302. A non-limiting example is 3M SJ3550CF Dual Lock, which has die cut ends that are visible for helping to align the platform channels. A clear foam adhesive allows the SJ3550CF to blend with different resin color.

Embodiments of the present disclosure are directed toward the use of additional pieces of reclosable fastening material, as well as providing an isopropyl alcohol wipe to clean a surface to which the reclosable fastening system is to be adhered.

Reclosable fastening systems are available in varying bond strengths (e.g., Dual Lock has different stem densities, with a higher stem density resulting in a stronger bond). The particular bond strength can be selected according to the particular application. Embodiments of the present disclosure are directed toward MPBPH devices that are configured and arranged to provide bond strength that meets a threshold value. The threshold bond strength can be met by modifying several factors. One factor is the type of reclosable fastening system that is used. For instance, the stem density is a variable for reclosable fastening systems such as Dual Lock. Another factor is the total area available for bonding. This can be controlled by adjusting the amount/area of useable reclosable fastening material that is on the MPBPH and/or on the surface to which the MPBPH is to be attached. In certain embodiments, different sized strips can be designed for attachment to the surface. A user of the MPBPH can select the appropriate strip size based upon the desired bond strength. For instance, the user may seek greater bond strength when the surface is a ground vehicle that will be traveling over rough terrain and less bond strength when the surface is a stable structure, such as the wall of a building.

To properly engage (attach together) two pieces of Dual Lock, a rocking motion should be employed, fastening the pieces from one end to the other. The force required to disengage or separate two pieces of Dual Lock is twice the amount of force required to engage the pieces. The use of Dual lock allows the MPBPH to be secured in a stationary manner to any surface, both vertically and horizontally (even upside down) and in all weather conditions.

Although not shown, the bottom of the MPBPH can also include one or more magnets. These magnets can be located within cavities, or recesses, designed to house the magnets. For instance, circular depressions can be placed in each corner, sized and configured to accommodate corresponding magnets (e.g., neodymium-iron-boron (NdFeB) magnets). The circular magnets can snap into the molded depressions without the use of glue or adhesives; however adhesives can be used instead (or in addition). Experimental testing suggests that fewer than four magnets can provide sufficient holding power; however, the use of four magnets may be particularly useful in situations where very high levels of magnetism are required.

Consistent with certain embodiments, the magnets have a phenolic coating. This coating can be particularly useful for several reasons. For instance, the phenolic coating can dull the magnets by coloring them black, which can reduce the visibility of the MPBPH and help with camouflage. Moreover, magnets, such as NdFeB magnets, can be subject to corrosion. The phenolic coating can provide corrosion resistance, abrasion resistance and chemical resistance.

Other embodiments of the present disclosure recognize that it may not be desirable to have multiple attachment mechanisms being used concurrently. For instance, if the MPBPH device is placed on a ferromagnetic wall, the combination of the magnet, gripping material and adhesive may require a detachment force that exceeds the desired range (e.g., relative to human hand strength). Accordingly, embodiments of the present disclosure are directed toward temporarily disabling one or more attachment mechanisms. As a non-limiting example, a thin (plastic) covering piece can be provided to cover the adhesive portion of the MPBPH device. The covering piece can thereby prevent the adhesive from sticking to a wall or similar structure, while still allowing the magnets to be used as the primary attachment mechanism. The covering piece can also protect the adhesive portion from exposure to dirt or other contaminants which might be on the wall. In one instance, this covering piece can be held in place by the adhesive portion itself; in other instances, the covering piece can snap or slide into place. Moreover, the covering piece can be used to protect the adhesive portion from damage or wear while the MPBPH is not in use.

Figure 4:
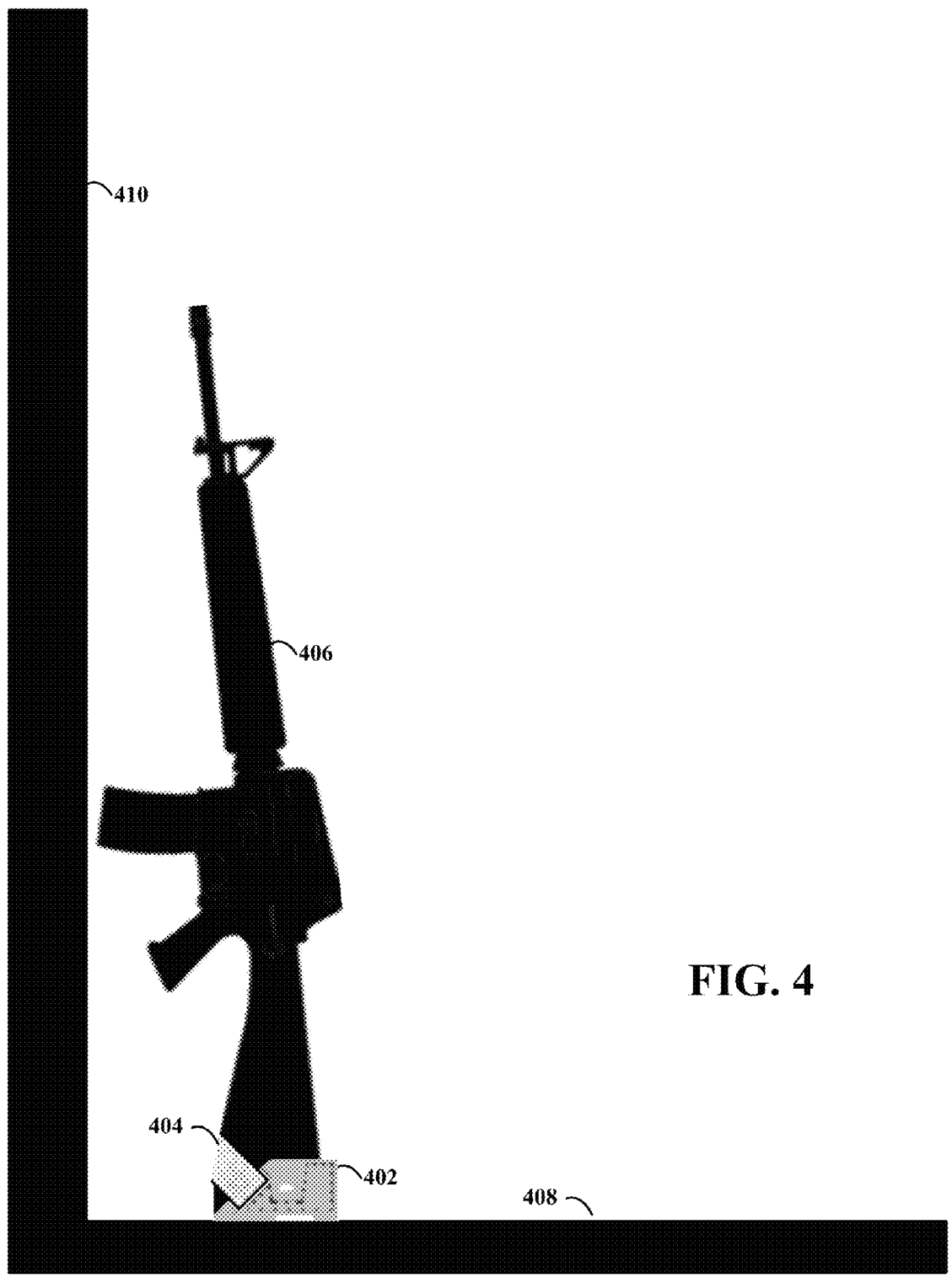
FIG. 4 depicts a MPBPH used to secure a firearm in a substantially vertical fashion, consistent with embodiments of the present disclosure.

FIG. 4 depicts a MPBPH used to secure a firearm in a substantially vertical fashion, consistent with embodiments of the present disclosure. Firearm 406 is shown as being secured by MPBPH 402. MPBPH 402 is secured to the horizontal surface 408 (e.g., the floor of a building, vessel or aircraft). For instance, MPBPH 402 can be fastened to surface 408 using one or more of a reclosable fastening system, screws, nails or magnets.

The butt of the firearm 406 is placed within the MPBPH 402 such that the sidewalls help to secure the firearm 406. In this manner, the firearm 406 is prevented from falling side to side by the sidewalls. Strap 404 can then be used to further secure firearm 406. Firearm 406 can also be stabilized by being in contact with the vertical surface 410 (e.g., a wall of a building, vessel or aircraft). Thus, MPBPH 402 can be located sufficiently close to accommodate this contact with the vertical surface 410.

Consistent with certain embodiments, additional support devices or elements can be used in conjunction with MPBPH 402. For instance, a support device can be placed on vertical surface 410 to secure the barrel of the firearm 406.

When the firearm 406 is removed from the storage location, the MPBPH 402 can also be removed so that it can later be used in another location. For instance, a solider may place a first strip of a reclosable fastener on the floor in a first location of a naval vessel. The MPBPH 402 can then be secured to the strip of a reclosable fastener and the firearm 406 can be secured. When the solider leaves this area, the firearm 406 can be removed along with the MPBPH 402. The solider may subsequently place a second strip of a reclosable fastener on the floor in a second location of a naval vessel, and use the MPBPH 402 at this second location. Soldiers can then continue to reuse these strips whenever they are in either of these locations.

Figure 5:
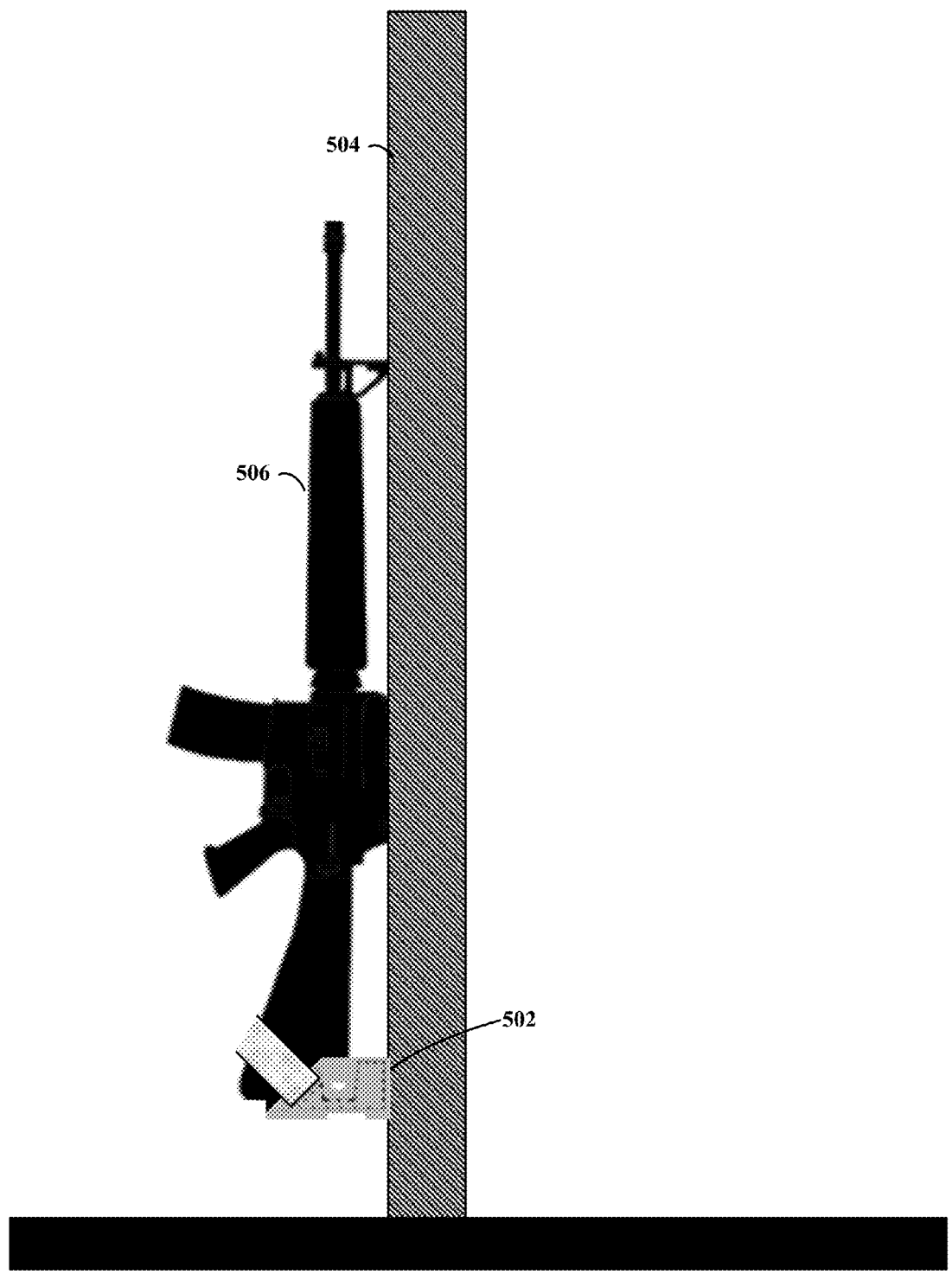
FIG. 5 depicts a MPBPH used to secure a firearm in a substantially vertical fashion while raised off of the ground, consistent with embodiments of the present disclosure.

FIG. 5 depicts a MPBPH used to secure a firearm in a substantially vertical fashion while raised off of the ground, consistent with embodiments of the present disclosure. FIG. 5 shows some of the versatility of the MPBPH 502. Here, the MPBPH 502 has been fixed to vertical surface 504. This allows for the firearm 506 to be secured off of the ground, which may protect the firearm from water and/or place the firearm at a more convenient height for retrieval.

Figure 6:
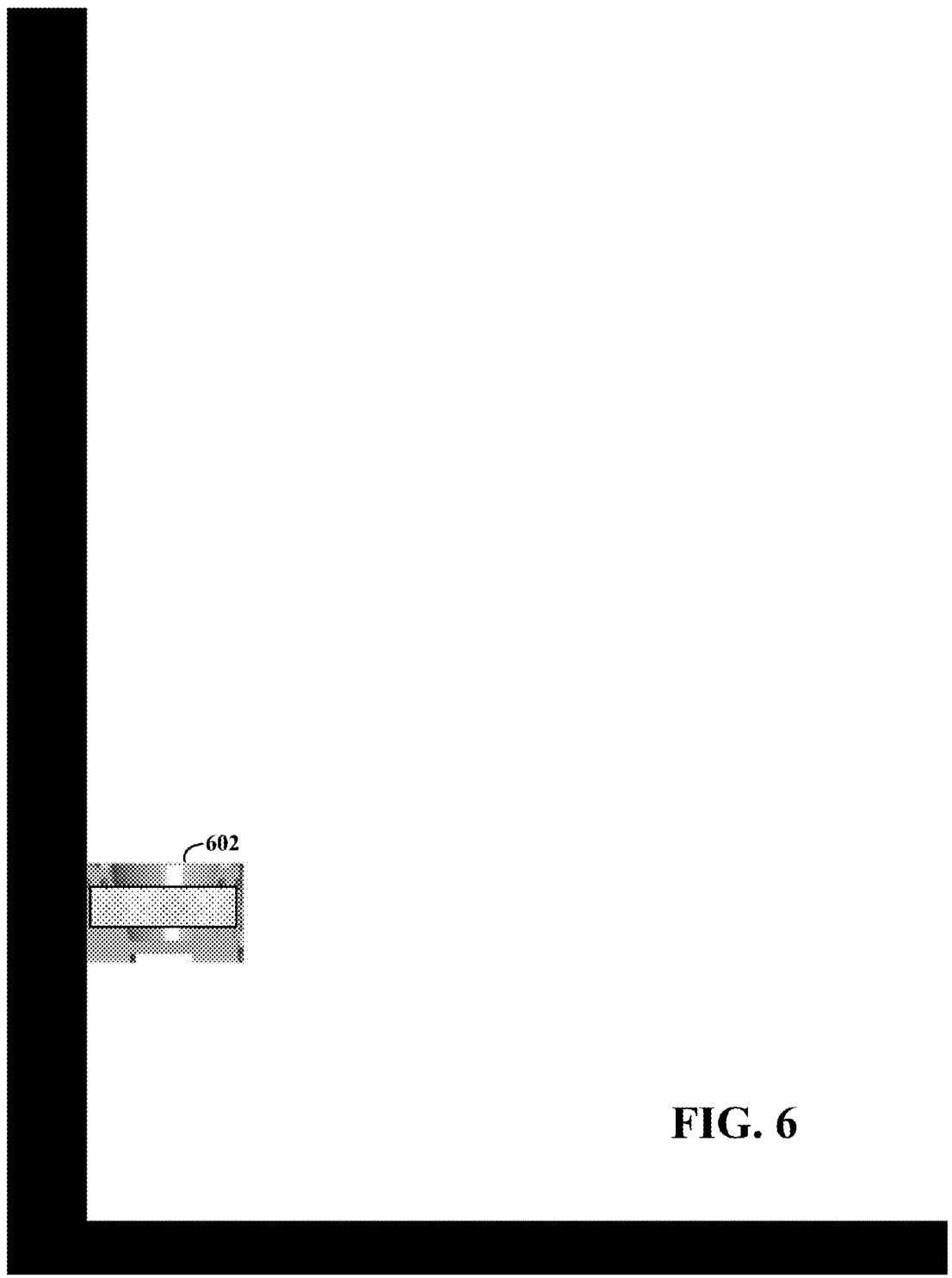
FIG. 6 depicts a MPBPH used to secure a firearm in a substantially vertical fashion while raised off of the ground and rotated, consistent with embodiments of the present disclosure.

FIG. 6 depicts a MPBPH used to secure a firearm in a substantially vertical fashion while raised off of the ground and rotated, consistent with embodiments of the present disclosure. The MPBPH 602 is attached off of the ground, as shown in FIG. 5; however, the MPBPH 602 has been rotated ninety degrees. This can be particularly useful for accommodating different sized and shaped firearms, which might otherwise not fit against the attached wall.

Figure 7:
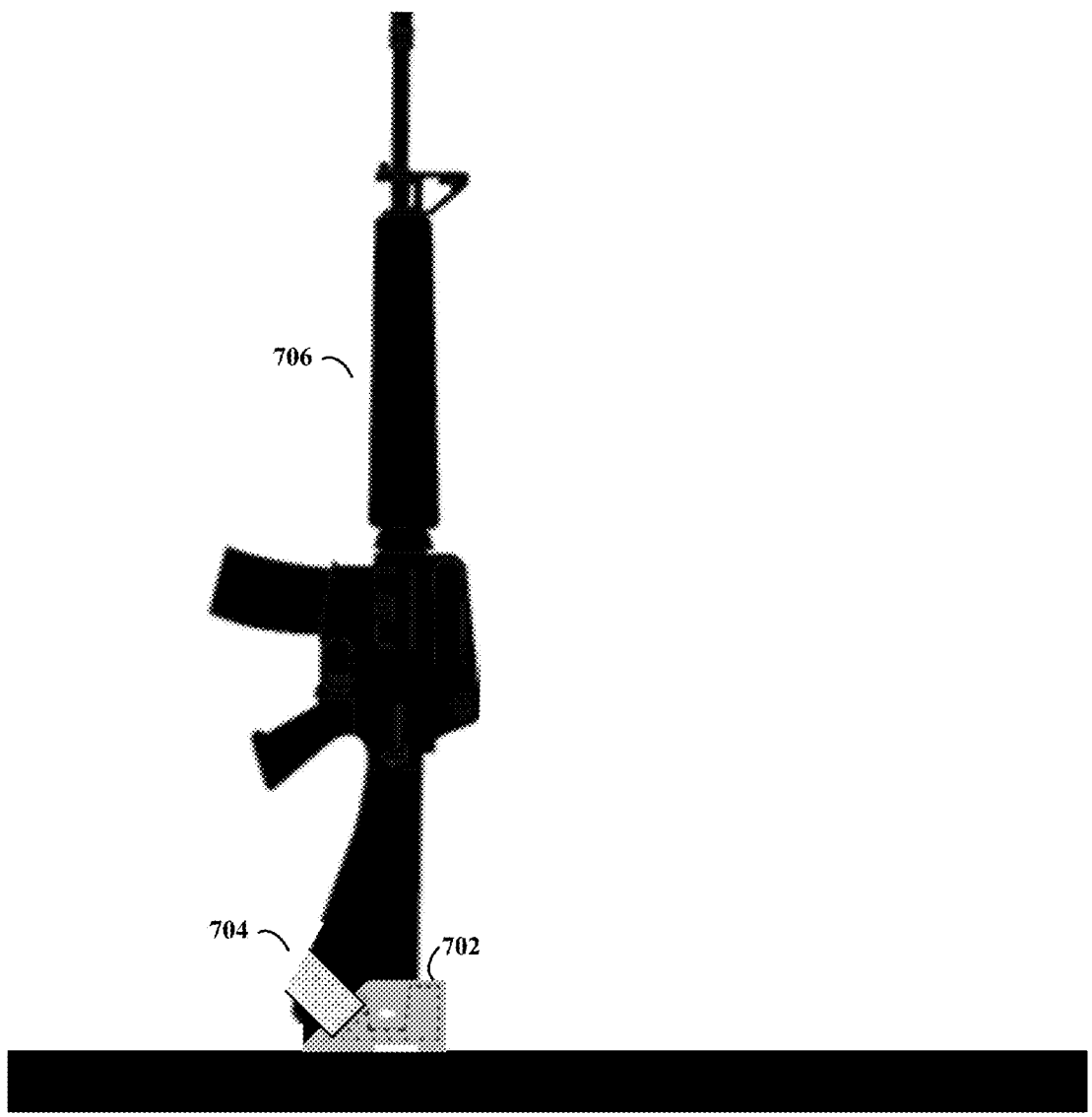
FIG. 7 depicts a MPBPH used to secure a freestanding firearm, consistent with embodiments of the present disclosure.

FIG. 7 depicts a MPBPH used to secure a freestanding firearm, consistent with embodiments of the present disclosure. The MPBPH 702 is attached to the ground, as shown in FIG. 4; however, the firearm 706 is not stabilized or otherwise supported by a horizontal structure. This is facilitated by the ability to sufficiently tighten strap 704. Accordingly, the firearm 706 can be supported on virtually any location, including the center of a room or other places where there is no wall or other structure to lean the firearm 706 against.

Figure 8:
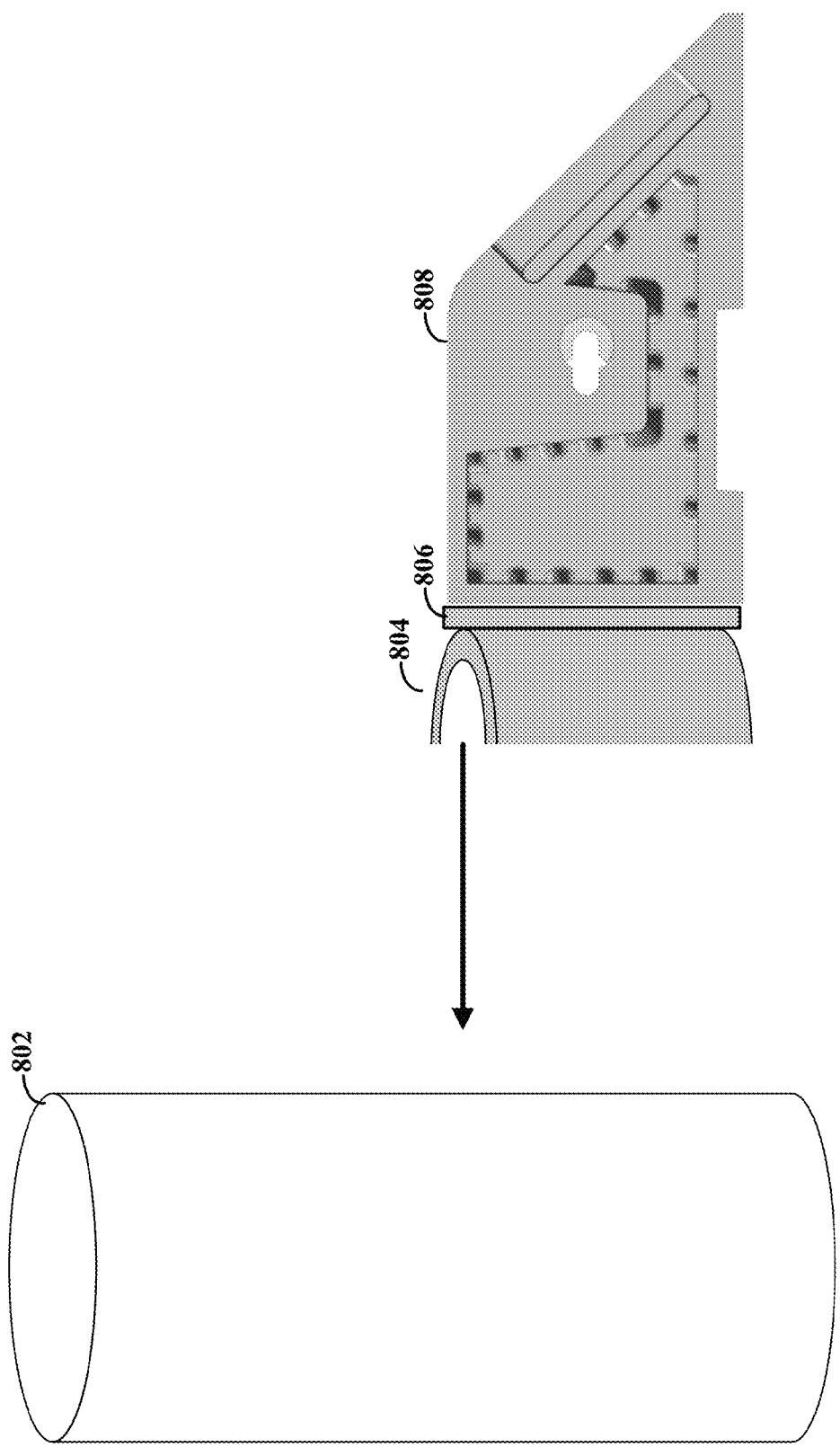
FIG. 8 depicts an MPBPH with a non-planar attachment surface, consistent with embodiments of the present disclosure.

FIG. 8 depicts a MPBPH with a non-planar attachment surface, consistent with embodiments of the present disclosure. Embodiments of the present disclosure are directed toward the use of attachment surface(s) that can be specially designed in non-planar configurations. This can facilitate attachment to different, non-planar surfaces. For instance, it may be desirable to attach the MPBPH 808 to a curved surface (such as a round pole 802) or to an angled surface (such as the corner of a building). Consistent with certain embodiments, customized MPBPHs can be designed with an outer surface that has the desired shape, whether curved, angled or otherwise. FIG. 8 depicts alternate embodiments where a MPBPH 808 with a relatively planer outer surface is modified by adding an attachment surface 804 that has the desired shape (depicted here as curved). An interface piece 806 can (optionally) connect the attachment surface 804 to the MPBPH 808.

It has been recognized that large scale uses of MPBPH devices by organizations such as the U.S. military can benefit from the use of modular components that can be readily replaced, changed and supplemented. For instance, certain types of reclosable fasteners can deteriorate from exposure to dirt, chemicals or environmental factor, and it can be important for a soldier to be able to quickly and securely replace damaged fasteners. The MPBPH device can be configured and arranged to allow a soldier to replace part or all of the reclosable fasteners while in the field, in seconds, and without tools.

The use of reclosable fasteners that are connected with adhesive can facilitate this action. For instance, damaged reclosable fasteners can be removed and replaced by pulling off (or scraping off) the reclosable fasteners, without having to scrap the entire MPBPH device.

Optional text, such as safety instructions, can be molded into the sides of the MPBPH. The section of the mold containing the instructions can be in the form of a removable plate that can be changed to accommodate different instructions, even different languages (sometimes referred to as a "slug").

Consistent with certain embodiments, a MPBPH device can be configured and designed to accommodate a strapping system that can serve a number of purposes, including securing a weapon within the MPBPH device. The handles 810 can also been designed to withstand forces necessary to disengage the MPBPH device when engaged with a surface (e.g., with adhesives, Dual Lock or magnets). A soldier can disengage the MPBPH by pulling in an upward motion directly on a handle or the strap.

Various embodiments are directed toward a strapping system, which can use military spec/flame retardant hook-and-loop or Velcro material. The flame retardant properties can be particularly useful for use on ships and aircraft. A black molded plastic D Ring can be attached (e.g., heat welded) to one end of the strap. The other end can be rounded to prevent injuries from sharp edges. Extending twelve inches from the D ring, the strap is fabricated from Velcro-type loop material. Four inches of Velcro hook material can be attached (e.g., heat welded) to the end of the loop material.

To secure a weapon, the strap can be fed up through one of the slotted handles, placed over the top of the butt stock of the weapon and down through the other slotted handle. When the strap is pulled tight, the D ring can be designed to rest within the specially designed cavities on the outer edges of the MPBPH (behind/next to the slotted handles). To secure the strap, the rounded end is pulled tight and placed against the loop material over the sheath. To release the strap, the rounded end is pulled in an upward direction.

In addition to securing a weapon in the MPBPH, the strap can be used to disengage the MPBPH by pulling the strap in an upward motion when the unit is fastened by reclosable fasteners or magnets.

The following discussion provides further details of one or more experimental embodiments and is not necessarily limiting on various embodiments discussed herein.

The MPBPH can be molded using Santoprene or other resins. Santoprene has properties similar to vulcanized rubber and is strong enough to withstand being stepped on and having metal butt plates pushed into it repeatedly. Various components of the MPBPH can also be designed to function in extreme temperature ranges to assure proper functioning from Arctic to desert conditions. For instance, Santopreen meets the needs of temperature extremes faced by the military with a functional range from −60° C. to 135° C. (−81° F. to 275° F.) with no cracking or tackiness. Santoprene also has good resistance to many acids, bases and aqueous solutions. A dull black color and stealthy matte finish can be used to reduce the amount of reflected light, which can improve camouflage qualities. In other embodiments, different types of materials, such as thermoplastics or a mixture of (virgin) ABS resins and fiberglass can be used. If the materials are smooth, the exterior surfaces can be heavily textured to achieve a sandpaper-like texture for easy gripping even in wet conditions.

The MPBPH can be designed to be small enough and light enough to be portable for use in the field. In a vehicle or airplane, the strap can also be used to prevent a weapon from dislodging due to bumps or turbulence. Moreover, the strap can secure additional components such as a removal tool or covering piece, as discussed herein. The MPBPH can be semi-permanently attached to almost any surface for side by side use in any type of weapon storage equipment, unit or facility.

Weapons that are stored shipboard must often contend with rolling seas and engine vibration, conditions that regularly cause weapon damage. Newer ships are being made of lighter metals such as stainless steel and aluminum. Magnets will not work on these metals. The MPBPH's Dual Lock fastening system can be designed to work on these metals and the Velcro strap will help to secure weapons and minimize damage in rough weather.

Consistent with embodiments of the present disclosure, the design may employ multiple methods of securing the MPBPH to a wide range of surfaces. These methods include a fastener material such as 3M Dual Lock®, key slots, and magnets. A gripping material can also be used to resist sheering pressures. The combination of Dual Lock, magnets, gripping material and key slots allow the MPBPH to securely adhere to almost any surface under any condition. For instance, embodiments of the present disclosure recognize that the MPBPH can be used to secure a weapon/firearm on vertical, horizontal and sloped planes, and recognize that the MPBPH can be secured to almost any surface.

The MPBPH can be designed to facilitate the safe handling and storage of military and tactical weapons. For example, the MPBPH can be designed to secure a rifle in a wide range of conditions. Many of the MPBPH features can be specifically designed for use by members of the Armed Forces. These features can be also useful for other tactical organizations using weapons, e.g., Homeland Security, Border Patrol, state and local police departments, and SWAT teams.

The various embodiments relating to an MPBPH device can be used in combination with other securing devices, systems and methods. Particular embodiments are directed toward the use of MPBPH device(s) with another firearm (barrel) securing device. Examples of such securing devices are provided in concurrently filed U.S. patent application Ser. No. 13/842,524 entitled "MULTIPURPOSE FIREARM SECURING DEVICE AND METHODOLOGY," to Tucker et al., which is fully incorporated herein by reference for all it contains. Moreover, MPBPH device(s) can be included (and used) in a system or kit, which includes other attachment solutions including, but not limited to, a firearm barrel securing device. Examples of such systems and kits are provided in concurrently filed U.S. patent application Ser. No. 13/842,886 entitled "MULTIPURPOSE FIREARM SECURING SYSTEMS, KITS AND METHODOLOGIES," to Tucker et al. Reference can also be made to U.S. Provisional Patent Application No. 61/735,236 to Tucker et al., which is fully incorporated herein by reference.

The various embodiments described above are provided by way of illustration only and should not be construed to limit the disclosure. Based upon the above discussion and illustrations, those skilled in the art will readily recognize that various modifications and changes may be made to the present disclosure without strictly following the exemplary embodiments and applications illustrated and described herein. For example, the methods, devices and systems discussed herein may be implemented in connection with various military environments and various types of applications. The disclosure may also be implemented using a variety of approaches such as those involving manufacturing variations and different uses of the MPBPH device. Such modifications and changes do not depart from the true spirit and scope of the present disclosure, including that set forth in the following claims.

What is claimed is:

1. An apparatus comprising:
a support structure having a base and a plurality of sidewalls, the base and sidewalls providing adjoined surfaces facing a space that is bound by the surfaces, the sidewalls being adjoined to the base and extending away from the base in a direction that is about perpendicular to a surface of the base, the adjoined surfaces being configured and arranged with one another to surround a butt of a firearm in the space on four sides with at least one of the surfaces supporting weight of the firearm via the butt;
in a first one of the sidewalls, a support component configured and arranged to secure the support structure to a surface while the firearm is supported by the support structure in the space, with the base extending away from the surface in a direction that is about perpendicular to a portion of the surface to which the first one of the sidewalls is secured by the support component; and
a securing component including a hook and loop material configured and arranged to secure the butt of the firearm within the space bound by the surfaces, by securing respective portions of the hook and loop material to one another to lock the securing component to the support structure and therein locking the butt to the support structure.

2. The apparatus of claim 1, wherein the adjoined surfaces of the sidewalls are configured and arranged with one another to surround three sides of the butt of a firearm including at least some of a stock of the butt with the base facing a fourth bottom side of the butt of the firearm, with the surfaces of the sidewalls and the base defining an opening extending from the surface of the base and vertically along the sidewalls, the first one of the sidewalls having an inner surface facing the opening.

3. The apparatus of claim 1, wherein the plurality of sidewalls include a second sidewall and a third sidewall that respectively extend from the first sidewall in a direction that is about perpendicular to the surface of the first sidewall.

4. The apparatus of claim 1, wherein the sidewalls and base are configured and arranged to surround and support weight of the butt of the firearm at each of a plurality of different orientations of the firearm relative to the surface, including a vertical orientation and a horizontal orientation.

5. The apparatus of claim 1, wherein the sidewalls and base are configured and arranged to support the entire weight of the firearm.

6. The apparatus of claim 1, further including a fastener configured and arranged with the support component to fasten the first sidewall to the surface.

7. The apparatus of claim 1, wherein a portion of the hook and loop type material is heat welded.

8. The apparatus of claim 1, wherein the securing component includes openings defined by respective ones of the sidewalls aligned in parallel with one another, and a strap configured and arranged with the openings to apply force to a surface of the butt that opposes a surface of the butt facing the surface, the force being in a direction toward at least one of the adjoined surfaces that bound the space.

9. The apparatus of claim 1, wherein the base includes at least one opening therein and configured and arranged to protect the butt from water.

10. The apparatus of claim 1, wherein at least one of the base and the plurality of sidewalls have at least one key slot opening configured and arranged to secure the one of the base and the plurality of sidewalls to a surface.

11. The apparatus of claim 1, wherein
at least one of the base and the plurality of sidewalls have a recessed channel and a reclosable fastener in the channel,
the channel is recessed from a planar face of the one of the base and the plurality of sidewalls, and
the reclosable fastener is configured and arranged with the channel to provide interlocking of the reclosable fastener with an external fastener on the surface to which the support structure is secured, with the planar face interfacing with the surface to which the support structure is secured along a plane defined by the planar face.

12. The apparatus of claim 11, wherein
the planar face has at least one opening configured and arranged to secure the planar face to the surface by engaging with a fastener extending through the opening, and
the recessed channel has a depth that is configured and arranged with the reclosable fastener to facilitate the interfacing of the planar face with the surface with the reclosable fastener in the channel.

13. The apparatus of claim 1, wherein the support component is configured and arranged to secure the apparatus to the support structure in response to an applied pressure.

14. The apparatus of claim 1, wherein the base and plurality of sidewalls are part of a contiguous molded component.

15. An apparatus comprising:
a first support structure having a base and a plurality of sidewalls, the base and sidewalls providing adjoined surfaces facing a space that is bound by the surfaces, the sidewalls being adjoined to the base and extending away from the base in a direction that is about perpendicular to a surface of the base, the adjoined surfaces being configured and arranged with one another to surround a butt of a firearm in the space on four sides with at least one of the surfaces supporting weight of the firearm via the butt, with at least one of the base and the plurality of sidewalls having a channel recessed from a planar face of the one of the base and the plurality of sidewalls;

a reclosable fastener in the channel and configured and arranged with the channel to provide interlocking of the reclosable fastener with an external fastener on a support surface to which the support structure is secured, with the planar face interfacing with the support surface to which the support structure is secured along a plane defined by the planar face; and in a first one of the sidewalls, a support component configured and arranged to secure the first support structure to a support surface while the firearm is supported by the support structure in the space, the first support structure and the support component being configured and arranged to operate with a second support structure that secures a barrel of the firearm, by supporting the entire weight of the firearm while the butt of the firearm is in the space and surrounded by the first support structure.

16. The apparatus of claim 15, wherein the first support structure and the support component are configured and arranged to operate with the second support structure to support the entire weight of the firearm at each of a plurality of different orientations of the firearm relative to the support surface, including a vertical orientation and a horizontal orientation, and wherein the adjoined surfaces are configured and arranged with one another to surround the butt of the firearm on four sides including a bottom side and three vertical sides while leaving a fourth vertical side unrestrained.

17. The apparatus of claim 15, wherein the apparatus includes the second support structure, the second support structure being disconnected from the first support structure and including:
a securing mechanism configured and arranged to generate a holding force between the second support structure and the support surface, and
a barrel securing component configured and arranged to secure the barrel to the second support structure in response to force applied to the barrel in a direction toward the barrel securing component.

18. A firearm securing apparatus comprising:
a first sidewall having a first surface configured and arranged to secure the apparatus to a support structure, the first surface including key slot openings configured and arranged to secure the apparatus to the support structure,
second and third sidewalls connected to the first sidewall and extending away from the support structure in a direction that is about perpendicular to the first surface, the second and third sidewalls having inner surfaces that face one another, the first sidewall having an inner surface that faces a region between the inner surfaces of the second and third sidewalls and that adjoins and is contiguous with the inner surfaces of the second and third sidewalls,
a bottom sidewall connected to the first, second and third sidewalls and extending away from the support structure in a direction that is about perpendicular to the first surface, the bottom sidewall having an inner surface that faces a space bound by the inner surfaces of the first, second and third sidewalls, the inner surface of the bottom sidewall adjoining and being contiguous with the inner surfaces of the first, second and third sidewalls and being configured and arranged with the inner surfaces of the first, second and third sidewalls to surround and support a butt of a firearm on four sides;

a securing component configured and arranged to prevent removal of the butt of the firearm from between the sidewalls; and a barrel securing structure configured and arranged to secure a barrel of the firearm to the support structure while the barrel securing structure is spaced apart from the sidewalls.

* * * * *